(12) United States Patent
Benveniste

(10) Patent No.: US 7,894,590 B2
(45) Date of Patent: *Feb. 22, 2011

(54) COMPLEMENTARY VOIP SERVICE

(75) Inventor: Mathilde Benveniste, South Orange, NJ (US)

(73) Assignee: Avaya Inc., Basking Ridge, NJ (US)

(*) Notice: Subject to any disclaimer, the term of this patent is extended or adjusted under 35 U.S.C. 154(b) by 1548 days.

This patent is subject to a terminal disclaimer.

(21) Appl. No.: 11/203,356

(22) Filed: Aug. 12, 2005

(65) Prior Publication Data

US 2006/0034261 A1 Feb. 16, 2006

Related U.S. Application Data

(60) Provisional application No. 60/600,809, filed on Aug. 12, 2004, provisional application No. 60/634,119, filed on Dec. 8, 2004.

(51) Int. Cl.
H04M 3/42 (2006.01)

(52) U.S. Cl. .............. 379/211.01; 379/211.02; 379/211.03; 379/221.01; 379/221.08; 379/207.01; 370/352

(58) Field of Classification Search .......... 370/352; 379/211.01, 211.02, 211.03, 221.01, 221.08, 379/207

See application file for complete search history.

(56) References Cited

U.S. PATENT DOCUMENTS

| 4,811,381 | A | 3/1989 | Woo et al. |
| 5,487,111 | A | 1/1996 | Slusky |
| 6,243,374 | B1 | 6/2001 | White et al. |
| 6,404,874 | B1 | 6/2002 | Chestnut |
| 6,480,484 | B2 | 11/2002 | Morton |
| 6,724,869 | B2 * | 4/2004 | Chapman et al. ......... 379/93.01 |
| 6,731,625 | B1 * | 5/2004 | Eastep et al. ................ 370/352 |
| 6,798,767 | B1 | 9/2004 | Alexander et al. |
| 6,865,266 | B1 | 3/2005 | Pershan |

(Continued)

FOREIGN PATENT DOCUMENTS

CA 2574071 A1 2/2006

(Continued)

OTHER PUBLICATIONS

A. Kakubari, "JP Application No. 2007-525820 Office Action", Feb. 4, 2009, Publisher: Japan Patent Office, Published in: JP.

(Continued)

Primary Examiner—Quynh H Nguyen
(74) Attorney, Agent, or Firm—DeMont & Breyer, LLC

(57) ABSTRACT

A technique is disclosed that enables a voice call to be initiated on the Public Switched Telephone Network and directed to a VoIP telephone on the Internet without the association of a unique telephone number to the VoIP telephone. In accordance with the illustrative embodiment of the present invention, a user who has a PSTN wireline telephone or a PSTN cell phone associates his or her VoIP telephone with the telephone number of the PSTN wireline telephone or the PSTN cell phone or with both numbers. In other words, the VoIP telephone is not assigned its own telephone number but shares the telephone number of the PSTN telephones of its owner.

9 Claims, 4 Drawing Sheets

U.S. PATENT DOCUMENTS

| | | | |
|---|---|---|---|
| 7,145,898 B1 * | 12/2006 | Elliott | 370/352 |
| 7,466,809 B2 * | 12/2008 | Carnazza et al. | 379/142.07 |
| 2002/0085701 A1 | 7/2002 | Parsons | |
| 2002/0118671 A1 | 8/2002 | Staples | |
| 2003/0053446 A1 | 3/2003 | Kwon | |
| 2003/0118039 A1 | 6/2003 | Nishi et al. | |
| 2003/0181209 A1 | 9/2003 | Forte | |
| 2004/0184592 A1 | 9/2004 | Kucmerowski | |
| 2004/0234063 A1 | 11/2004 | Milton et al. | |
| 2005/0025294 A1 * | 2/2005 | Matsuhashi et al. | 379/88.17 |
| 2005/0135342 A1 | 6/2005 | Kim | |
| 2006/0018310 A1 | 1/2006 | Stevens et al. | |

FOREIGN PATENT DOCUMENTS

| | | | |
|---|---|---|---|
| JP | 2000023214 A | | 2/2000 |
| JP | 2001320485 A | | 11/2001 |
| JP | 2003046645 A | | 2/2003 |
| JP | 2003092613 A | | 3/2003 |
| JP | 2003304327 A | | 10/2003 |
| KR | 100227159 B1 | | 10/1999 |
| KR | 20000016424 A | | 3/2000 |
| WO | 0239681 A1 | | 5/2002 |

OTHER PUBLICATIONS

Sang-Hyeon Park, "KR Application No. 2007-7003368 Office Action", Jan. 30, 2009, Publisher: Korean Patent Office, Published in: KR.

A. Kakubari, "JP Application No. 2007-525794 Office Action ", Feb. 4, 2009, Publisher: Japan Patent Office, Published in: JP.

Hyam, Kristy, "CA Application No. 2,574,071 Office Action May 6, 2009",, Publisher: CIPO, Published in: CA.

Branko, Willems, "EP Application No. 05789847.0-1237 / 1800461 Extended European Search Report Aug. 4, 2009" Publisher: EPO, Published in: EP.

Zenati, Amal S., "U.S. Appl. No. 11/203,350 Office Action Jul. 9, 2009", , Publisher: USPTO, Published in: US.

Branko, Willems, "EP Application No. 05788056.9-1237 / 1779618 Extended European Search Report Aug. 4, 2009", , Publisher: EPO, Published in: EP.

Zenati, Amal S., "U.S. Appl. No. 11/203,350 Office Action", Jan. 12, 2009, Publisher: USPTO, Published in: US.

"KR Appl. No. 2007-7003368 Office Action Nov. 21, 2007", , Publisher: KIPO, Published in: KR.

Kakuhara, A., "JP Application No. 2007-525820 Office Action Dec. 16, 2009", , Publisher: JPO, Published in: JP.

"KR Application No. 2007-7003368 Office Action Jul. 28, 2008", , Publisher: KIPO, Published in: KR.

Zenati, Amal S., "U.S. Appl. No. 11/203,350 Notice of Allowance Jan. 11, 2010", , Publisher: USPTO, Published in: US.

Kakubari, A., "JP Application No. 2007-525794 Office Action Dec. 16, 2009", , Publisher: JPO, Published in: JP.

"KR Application No. 2007-7003354 Office Action Apr. 25, 2008", , Publisher: KIPO, Published in: KR.

Tsegaya, Saba, "PCT Application No. PCT/US2005/028573 International Preliminary Report on Patentability Feb. 22, 2007", , Publisher: PCT, Published in: PCT.

Tsegaye, Saba, "PCT Appliction No. PCT/US05/28573 International Search Report Apr. 13, 2006", , Publisher: PCT, Published in: PCT.

Kakubari, A., "JP Application No. 2007-525794 Office Action Jul. 5, 2010", , Publisher: JPO, Published in: JP.

Ginese, Salvatore, "CA Application No. 2,574,069 Office Action Apr. 13, 2010", , Publisher: CIPO, Published in: CA.

\* cited by examiner

COMPLEMENTARY VOIP SERVICE

CROSS-REFERENCE TO RELATED APPLICATIONS

This application claims the benefit of:
(1) U.S. Patent Application Ser. No. 60/600,809, filed Aug. 12, 2004, and
(2) U.S. Patent Application Ser. No. 60/634,119, filed Dec. 8, 2004, which are both also incorporated by reference:

U.S. patent application Ser. No. 11/203,350, filed Aug. 12, 2005, entitled "Direct Calling to Devices Via a Shared Telephone Number," is also incorporated by reference.

FIELD OF THE INVENTION

The present invention relates to telecommunications in general, and, more particularly, to a voice telecommunications system that spans the Public Switched Telephone Network and the Internet.

BACKGROUND OF THE INVENTION

The advent of the ability to establish a voice call over the Internet, colloquially called "VoIP" and pronounced "VoIP" has well-known advantages, but it will be some years before the Public Switched Telephone Network is completely displaced by VoIP. During the transition, however, people will desire to initiate a voice call on the Public Switched Telephone Network ("PSTN") to a VoIP telephone on the Internet. There is problem developing with doing this, however, which is illustrated in FIGS. 1 and 2 and the accompanying text.

FIG. 1 depicts a schematic diagram of the salient components of a telecommunications system in the prior art in which a voice call on the Public Switched Telephone Network terminates at a VoIP telephone on the Internet. System 100 comprises PSTN telephone 101, VoIP telephone 102, switching network 111, PSTN/VoIP gateway 112, and dynamic name system server 113. Both PSTN telephone 101 and VoIP telephone 102 are associated with a unique telephone number so that they can called.

FIG. 2 depicts a flowchart of the salient tasks in the prior art associated with the establishment of a voice call that begins at a telephone in the Public Switched Telephone Network and terminate as a VoIP call on the Internet.

At task 201, a call is initiated from PSTN telephone 101 to VoIP telephone 102, by dialing the telephone number of VoIP telephone 102.

At task 202, switching network 111 knows from its directory table that VoIP telephone 102 is reachable via PSTN/VoIP gateway 112, and, therefore, switching network 111 transmits a call set-up message to PSTN/VoIP gateway 112. The call set-up message comprises the telephone number of VoIP telephone 102.

At task 203, PSTN/VoIP gateway 112 finds the current IP address of VoIP telephone 102 from the telephone number of VoIP telephone 102 by converting the telephone number into a dynamic name system address and by transmitting the dynamic name system address to dynamic name system server 113.

At task 204, PSTN/VoIP gateway 112 receives the current IP address of VoIP telephone 102 from dynamic name system server 113.

At task 205, PSTN/VoIP gateway 112 attempts to establish a voice call with VoIP telephone 102 at the IP address received in task 204.

The problem with this technique is that VoIP telephone 102 must have a unique telephone number. As the number of VoIP telephones increases, the number of newly issued telephone numbers also increases, which is expensive. The need exists, therefore, for a technique for establishing a voice call on the Public Switched Telephone Network to a VoIP telephone on the Internet without the association of a unique telephone number to the telephone.

SUMMARY OF THE INVENTION

The present invention is a technique that enables a voice call to be initiated on the Public Switched Telephone Network and directed to a VoIP telephone on the Internet without the association of a unique telephone number to the VoIP telephone.

In accordance with the illustrative embodiment of the present invention, a user who has a PSTN wireline telephone or a PSTN cell phone associates his or her VoIP telephone with the telephone number of the PSTN wireline telephone or the PSTN cell phone or with both numbers. In other words, the VoIP telephone is not assigned its own telephone number but shares the telephone number of the PSTN telephones of its owner. The technique is, therefore, a VoIP service that is complementary to PSTN service.

For example, when a call is placed to the user's PSTN wireline telephone—using the PSTN wireline telephone's number—the PSTN first attempts to set up the call with the user's PSTN wireline telephone. When the user can answer his or her PSTN wireline telephone, the switching network establishes the call with the PSTN wireline telephone. In contrast, if the user cannot answer his or her PSTN wireline telephone, the switching network forwards the call to the PSTN/VoIP gateway. The PSTN/VoIP gateway uses the telephone number of the user's PSTN wireline telephone—the "originally-called telephone number"—to find, directly or indirectly, the current IP address of the user's VoIP terminal. Once the PSTN/VoIP gateway has the current IP address of the VoIP telephone, the PSTN/VoIP gateway then attempts, in well-known fashion, to establish the call with the VoIP telephone. The same technique can be used for the user's other PSTN terminals, and this eliminates the need for associating a unique telephone number with the VoIP terminal.

The illustrative embodiment of the present invention comprises: receiving a call set-up message for a voice telephone call that has been forwarded from an originally-called telephone number, wherein the originally-called telephone number is an address in the address space of the Public Switched Telephone Network; and attempting to establish the voice telephone call with a device that has an address in the address space of the Internet; wherein the address of the device is found from the originally-called telephone number.

DETAILED DESCRIPTION

Figure 1:
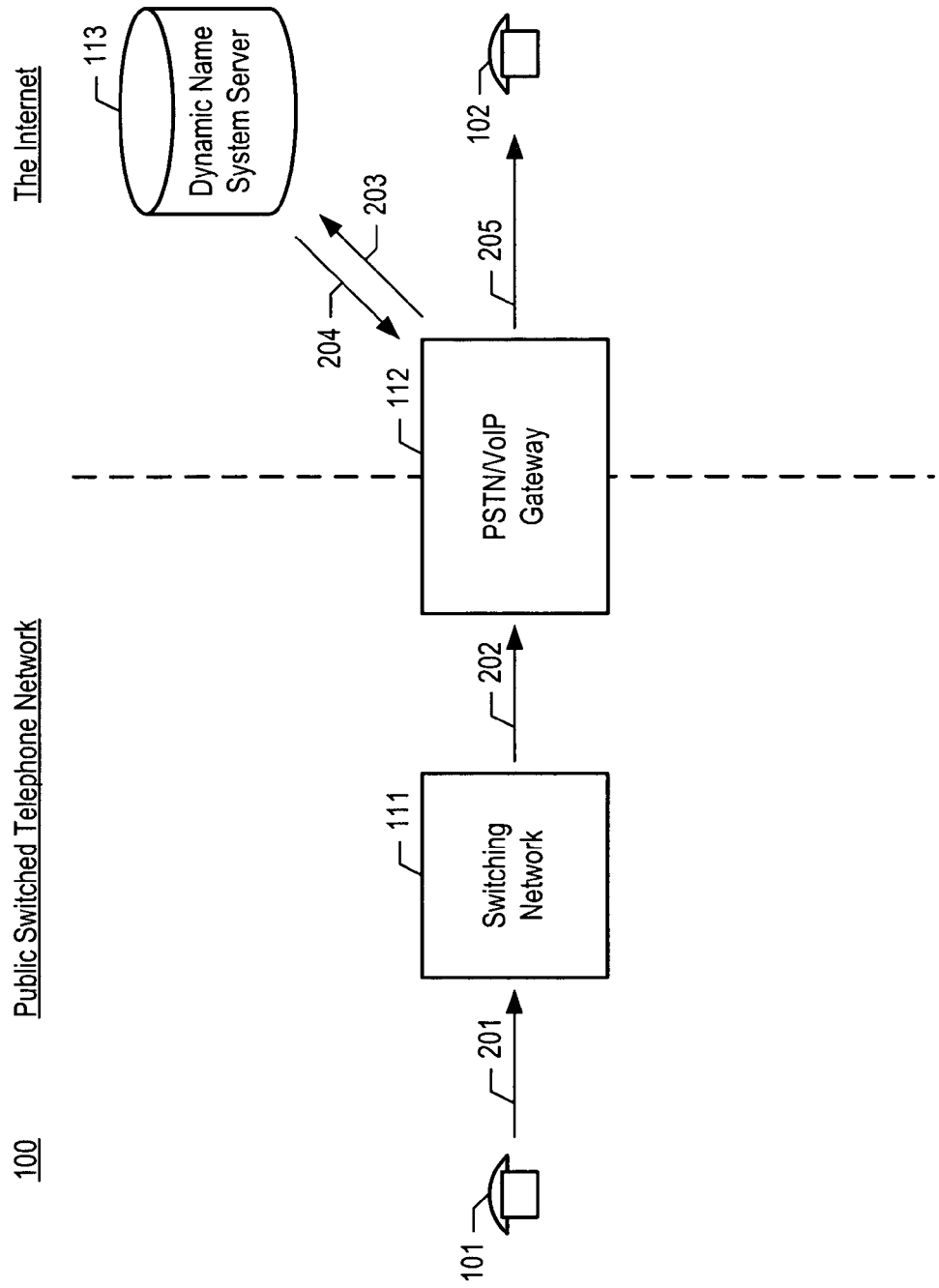
FIG. 1 depicts a schematic diagram of the salient components of a telecommunications system in the prior art in which a voice call on the Public Switched Telephone Network ("PSTN") terminates as a VoIP call on the Internet.
Figure 2:
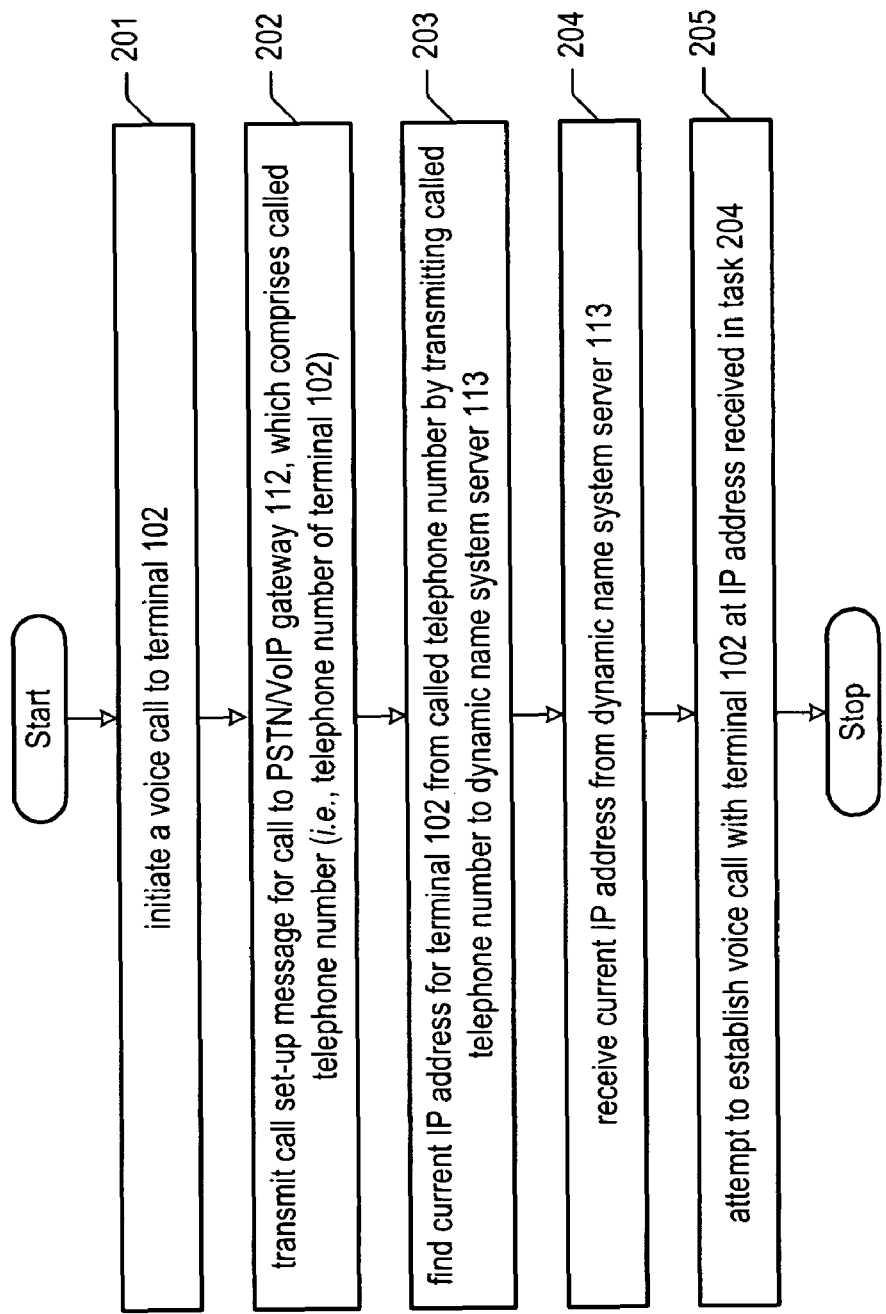
FIG. 2 depicts a flowchart of the salient tasks in the prior art associated with the establishment of a voice call that begins at a telephone in the Public Switched Telephone Network and terminate as a VoIP call on the Internet.
Figure 3:
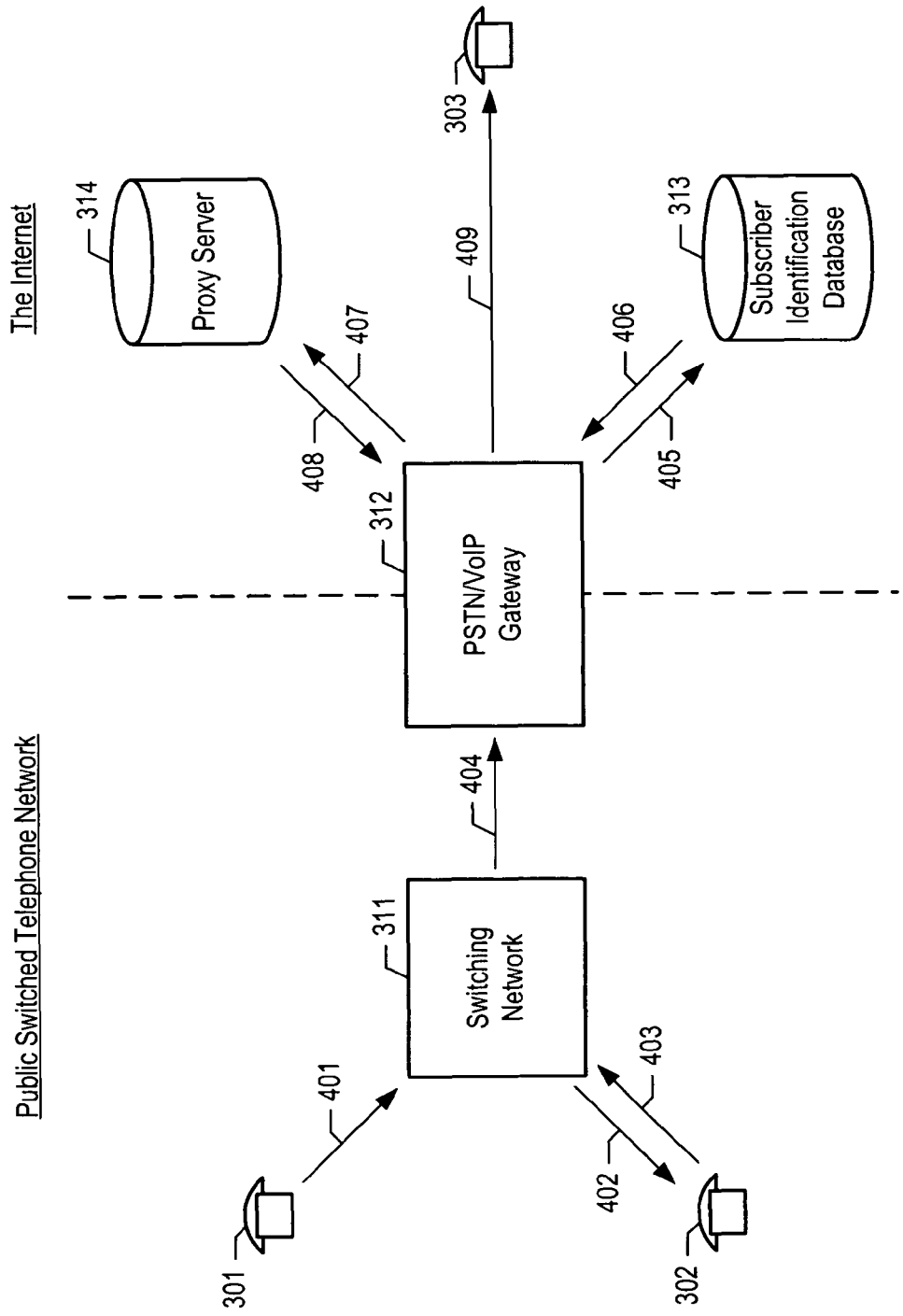
FIG. 3 depicts a schematic diagram of the salient components of a telecommunications system in accordance with the illustrative embodiment of the present invention.
Figure 4:
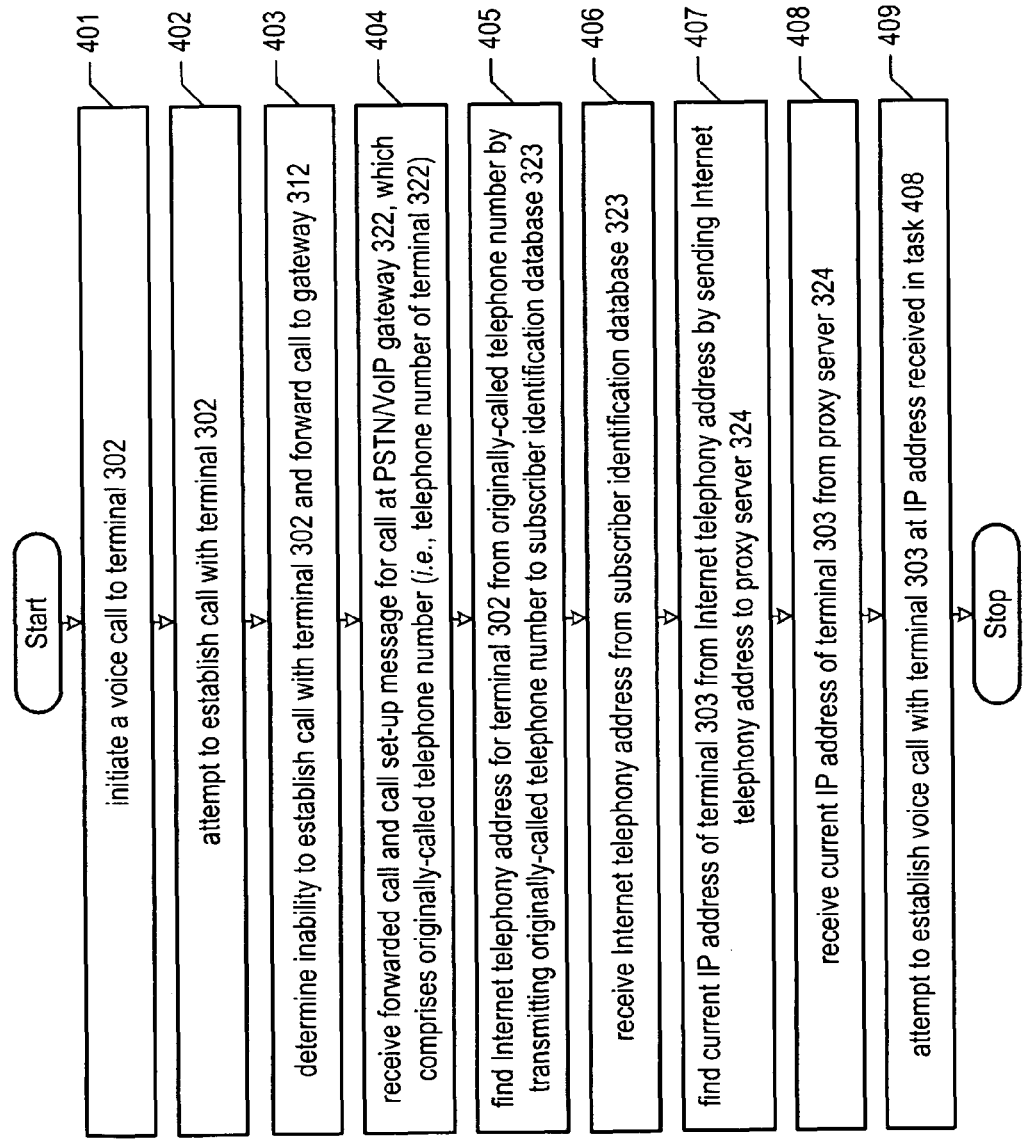
FIG. 4 depicts a flowchart of the salient tasks associated with the operation of the illustrative embodiment.

FIG. 3 depicts a schematic diagram of the salient components of a telecommunications system in accordance with the illustrative embodiment of the present invention. System 300 comprises: PSTN telephones 301 and 302, VoIP telephone 303, switching network 311, PSTN/VoIP gateway 312, subscriber identification database 313, and proxy server 314, interrelated as shown.

PSTN telephones 301 and 302 and switching network 311 reside in the domain of the Public Switched Telephone Network, and VoIP telephone 303, subscriber identification database 313, and proxy server 314 reside in the domain of the Internet. PSTN/VoIP gateway 312 resides in both domains and functions as the bridge between them. It will be clear to those skilled in the art, however, after reading this disclosure, how to make and use alternative embodiments of the present invention with any circuit-switched telephony network and any packet-based network.

PSTN telephones 301 and 302 and VoIP telephone 303 are well known in the prior art and are devices that can function as telephones in that they can convert acoustic signals to electrical signals and electrical signals to acoustic signals. PSTN telephones 301 and 302 and VoIP telephone 303 can be special-purpose devices (e.g., a telephone, etc.) that are used only for telephony or general-purpose devices (e.g., a computer, etc.) that can be used for both telephony and non-telephony both.

PSTN telephones 301 and 302 can be wireline (e.g., Tip-Ring, ISDN, etc.) or wireless (e.g., cellular, etc.) devices that are each associated with a unique address (i.e., telephone number) in the address space of the Public Switched Telephone Network. VoIP telephone 303 can be a wireline (e.g., TCP/IP, etc.) or wireless (e.g., 802.11, Bluetooth, etc.) device that is associated with (1) an Internet telephony address (e.g., bob@avaya.com, etc.) and (2) an IP address in the address space of the Internet. It will be clear to those skilled in the art how to make and use PSTN telephones 301 and 302 and VoIP telephone 303.

Switching network 311 is well known in the prior art and comprises the hardware and software necessary to receive a telephone call from PSTN telephone 301 that is directed to PSTN telephone 302 but that is forwarded to PSTN/VoIP gateway 312 conditionally or unconditionally. It will be clear to those skilled in the art how to make and use switching network 311.

PSTN/VoIP gateway 312 comprises the hardware and software necessary to perform the functionality described below and with respect to FIG. 3.

Subscriber identification database 313 is a database that correlates telephone numbers (i.e., addresses in the address space of the Public Switched Telephone Network) with Internet telephony addresses (e.g., bob@avaya.com, etc.). A portion of subscriber identification database 313 is depicted in Table 1.

TABLE 1

Subscriber Identification Database 313

| PSTN Telephone Number | Internet Telephony Address |
|---|---|
| 348-555-2443 | benedict@avaya.com |
| 123-753-6642 | dorothy@avaya.com |
| ... | ... |
| 654-345-3562 | lauren@avaya.com |
| 945-843-6321 | mary@avaya.com |

Proxy server 314 is well known in the prior art and comprises the hardware and software necessary to find the current IP address of VoIP telephone 303 based on the Internet telephony address of VoIP telephone 303. It will be clear to those skilled in the art how to make and use proxy server 314.

FIG. 3 depicts a flowchart of the salient tasks associated with the operation of the illustrative embodiment.

At task 401, a call is initiated in well-known fashion, from PSTN telephone 301 to PSTN telephone 302, which is received by switching network 311. It will be clear to those skilled in the art, after reading this disclosure, how to make and use embodiments of the present invention in which the call originates at a VoIP terminal.

At task 402, switching network 311 attempts to set up the call with PSTN telephone 302 in well-known fashion.

At task 403, switching network 311 is unable to set up the call with PSTN telephone 302, and, therefore, forwards the call to PSTN/VoIP gateway 312. This could be because there was no one available to answer PSTN telephone 302, or because all calls to PSTN telephone 302 were conditionally or unconditionally forwarded to PSTN/VoIP gateway 312. When a call to PSTN telephone 302 is forwarded to PSTN/VoIP gateway 312, switching network 311 transmits, as part of task 403, an SS7 ISUP set-up message to PSTN/VoIP gateway 312, which message contains the originally-called telephone number (i.e., the telephone number of telephone 302).

At task 404, PSTN/VoIP gateway 312 receives the SS7 ISUP set-up message, knows it was a forwarded number, and extracts the originally-called telephone number. Because the number was forwarded, PSTN/VoIP gateway 312 begins the process of establishing the call to the VoIP terminal associated with the originally-called telephone number (i.e., the telephone number of PSTN terminal 302).

At task 405, PSTN/VoIP gateway 312 transmits the originally-called telephone number to subscriber identification database 313.

At task 406, subscriber identification database 313 finds the Internet telephony address for VoIP telephone 303 from the originally-called telephone number and transmits the found Internet telephony address back to PSTN/VoIP gateway 312.

At task 407, PSTN/VoIP gateway 312 transmits the Internet telephony address to proxy server 314, in well-known fashion, to find the current IP address of VoIP telephone 303.

At task 408, proxy server 314, receives the Internet telephony address, finds the current IP address of VoIP telephone 303, and transmits the IP address back to PSTN/VoIP gateway 312, all in well-known fashion.

At task 409, PSTN/VoIP gateway 312 attempts, in well-known fashion, to establish the voice call using the IP address received in task 408.

It is to be understood that the above-described embodiments are merely illustrative of the present invention and that many variations of the above-described embodiments can be devised by those skilled in the art without departing from the scope of the invention. It is therefore intended that such variations be included within the scope of the following claims and their equivalents.

What is claimed is:

1. A method for sharing a telephone number of a telephone device that is in the Public Switched Telephone Network with an Internet Protocol device that is outside the Public Switched Telephone Network, the method comprising:

receiving, at a gateway, a call set-up message for a voice telephone call that was originally addressed to the telephone device that is in the Public Switched Telephone Network, wherein the call has been forwarded from the telephone number of the telephone device that was originally called, and wherein telephone number is an address in the address space of the Public Switched Telephone Network; and attempting, without human intervention and without intervention by an interactive-voice-response system, to establish the voice telephone call with the Internet Protocol device, wherein the Internet Protocol device (i) has an address in the address space of the Internet, and (ii) lacks a unique telephone number in the address space of the Public Switched Telephone Network;

wherein the address of the Internet Protocol device is found from an association between (i) the telephone number of the originally-called telephone device and (ii) an Internet-telephony-address, wherein the association resides in a Subscriber Identification database.

2. The method of claim 1 wherein the telephone number of the originally-called telephone device is further associated with the address of the Internet Protocol device in the address space of the Internet.

3. The method of claim 1 wherein the address of the Internet Protocol device is found indirectly from the association, and further comprising:

finding the address of the Internet Protocol device in the address space of the Internet from the Internet-telephony-address; and finding the Internet-telephony-address from the association.

4. A gateway for sharing a telephone number of a telephone device that is in the Public Switched Telephone Network with an Internet protocol device that is outside the Public Switched Telephone Network, the gateway comprising:

a receiver for receiving a call set-up message for a voice telephone call that was originally addressed to the telephone device that is in the Public Switched Telephone Network, wherein the call has been forwarded from the telephone number of the telephone device that was originally called, and wherein the telephone number is an address in the address space of the Public Switched Telephone Network;

a transmitter for attempting, without human intervention and without intervention by an interactive-voice-response system, to establish the voice telephone call with the Internet Protocol device, wherein the Internet Protocol device (i) has an address in the address space of the Internet, and (ii) lacks a unique telephone number in the address space of the Public Switched Telephone Network; and an association between (i) the telephone number of the originally-called telephone device and (ii) an Internet-telephony-address, wherein the address of the Internet Protocol device is found from the association.

5. The gateway of claim 4 wherein the telephone number of the originally-called telephone device is further associated with the address of the Internet Protocol device in the address space of the Internet.

6. The gateway of claim 4 further comprising a Subscriber Identification database that comprises the association, wherein the address of the device is found indirectly from the Subscriber Identification database.

7. The gateway of claim 6 further comprising a proxy server for finding the address of the Internet Protocol device in the address space of the Internet from the Internet-telephony-address.

8. A method for sharing a telephone number of a telephone that is in the Public Switched Telephone Network with an Internet Protocol device that is outside the Public Switched Telephone Network, the method comprising:

receiving, by a gateway, a call set-up message for a voice telephone call that was originally addressed to the telephone device that is in the Public Switched Telephone Network, wherein the call has been forwarded from the telephone number of the telephone device that was originally called;

finding, at a Subscriber Identification database, an Internet-telephony-address from an association between (i) the telephone number of the originally-called telephone device and (ii) an Internet-telephony-address;

finding an Internet Protocol address of the Internet Protocol device from the Internet-telephony-address, wherein (i) the Internet Protocol address is an address in the address space of the Internet, and (ii) the Internet Protocol device lacks a unique telephone number in the address space of the Public Switched Telephone Network; and attempting, without human intervention and without intervention by an interactive-voice-response system, to establish the voice telephone call with the Internet Protocol device using the Internet Protocol address.

9. A system for sharing a telephone number of a telephone that is in the Public Switched Telephone Network with an Internet Protocol device that is outside the Public Switched Telephone Network, the system comprising:

a receiver for receiving a call set-up message for a voice telephone call that was originally addressed to the telephone device that is in the Public Switched Telephone Network, wherein the call has been forwarded from telephone number of the telephone device that was originally called, and wherein the telephone number of the telephone device is an address space in the space of the Public Switched Telephone Network;

a Subscriber identification database for finding an Internet-telephony-address from an association between (i) the telephone number of the originally-called telephone device and (ii) the Internet-telephony-address;

a proxy server for finding an Internet Protocol address of the Internet Protocol device from the Internet-telephony-address, wherein (i) the Internet Protocol address is an address in the address space of the Internet, and (ii) the Internet Protocol device lacks a unique telephone number in the address space of the Public Switched Telephone Network; and a transmitter for attempting, without human intervention and without intervention by an interactive-voice-response system, to establish the voice telephone call with the Internet Protocol device using the Internet Protocol address.

* * * * *